(12) United States Patent
Fu

(10) Patent No.: US 8,404,114 B2
(45) Date of Patent: Mar. 26, 2013

(54) DRINKING WATER FILTER

(76) Inventor: Han-Tang Fu, Taipei (TW)

( * ) Notice: Subject to any disclaimer, the term of this patent is extended or adjusted under 35 U.S.C. 154(b) by 282 days.

(21) Appl. No.: 12/980,368

(22) Filed: Dec. 29, 2010

(65) Prior Publication Data

US 2012/0168367 A1    Jul. 5, 2012

(51) Int. Cl.
*B01D 27/02* (2006.01)
*B01D 35/06* (2006.01)
*B01D 39/06* (2006.01)

(52) U.S. Cl. ........ 210/202; 210/223; 210/287; 210/290; 210/501; 210/502.1

(58) Field of Classification Search .................. 210/202, 210/223, 266, 287, 290, 501, 502.1, 510.1
See application file for complete search history.

(56) References Cited

U.S. PATENT DOCUMENTS

| | | | | |
|---|---|---|---|---|
| 3,872,013 A | * | 3/1975 | Nishino et al. | 210/317 |
| 4,787,973 A | * | 11/1988 | Ando et al. | 210/282 |
| 5,628,900 A | * | 5/1997 | Naito | 210/223 |
| 6,093,236 A | * | 7/2000 | Klabunde et al. | 95/128 |
| 6,833,075 B2 | * | 12/2004 | Hughes | 210/679 |
| 7,658,845 B2 | * | 2/2010 | Lee | 210/223 |
| 2010/0269731 A1 | * | 10/2010 | Tofte Jespersen et al. | 106/18.32 |
| 2012/0168371 A1 | * | 7/2012 | Fu | 210/503 |

FOREIGN PATENT DOCUMENTS

KR    100805199 B1 *  2/2009
KR    100964560 B1 *  6/2010

* cited by examiner

*Primary Examiner* — Matthew O Savage

(57) ABSTRACT

A filter cartridge includes, from top to bottom, a main filter comprising grains including ceramic soil and a mixture including tourmaline powder, mica powder, mineral powder, germanite powder, calcite powder, amber powder, agate powder, actinolite powder, crystal powder, and jade powder; a germanite layer comprising grains including ceramic soil and a mixture including germanite powder and selenium powder; a pearl layer comprising grains including ceramic soil and a mixture including pearl powder; an ore layer comprising grains including ceramic soil and a mixture including ore powder capable of emitting far-infrared radiation; a mineral layer comprising grains including ceramic soil and a mixture including mineral powder and calcite; and a gold layer comprising grains including ceramic soil and a mixture including gold powder.

3 Claims, 6 Drawing Sheets

DRINKING WATER FILTER

BACKGROUND OF THE INVENTION

1. Field of Invention

The invention relates to water filtration and more particularly to a drinking water filter with improved characteristics.

2. Description of Related Art

It is estimated that over one billion people worldwide lack access to clean drinking water. Water-borne diseases are one of the leading causes of disease and death in the world. Many water systems fail due to complexity of operations, costs, expense, inconvenient use, not portable, and requiring chemicals and energy. Industries are seeking sustainable cost effective water supply systems to provide water to their facilities. In dealing with water scarcity, there is an increasing demand for rain water and industrial wastewater filtration and recycling using sustainable systems that do not rely on additional chemical treatment or extensive maintenance. There are many different approaches to providing clean drinking water such as filtration, ultra filtration, UV (ultra violet) oxidation, and chemical disinfection. These approaches typically address only parts of the needs for water purification. Water treatment units that rely on portable hydrocarbon based power generation increase the risk of contamination of the water source.

There is a commercially available type of water filter including a cylindrical hollow filter cartridge having multiple filter pads, a layer of granulated zinc and copper alloy, a layer of granulated activated carbon, a layer of ion-exchange resin, and a layer of granulated calcite.

The above typical water filter does not disclose the unique features and advantages of the subject drinking water filter used with a tap water supply as described herein.

SUMMARY OF THE INVENTION

It is therefore one object of the invention to provide a water filter for treating tap water from a water supply, comprising a water inlet; a water outlet; and a filter cartridge disposed between the water inlet and the water outlet, the filter cartridge comprising a main filter located directly downstream from the water inlet and comprising a plurality of grains each including a granulated first mixture and ceramic soil surrounding the first mixture, the first mixture including tourmaline powder, mica powder, mineral powder, germanite powder, calcite powder, amber powder, agate powder, actinolite powder, crystal powder, and jade powder, the main filter being used for removing large particles and floating solids in the water; a germanite layer located directly downstream from the main filter and comprising a plurality of grains each including a granulated second mixture and the ceramic soil surrounding the second mixture, the second mixture including germanite powder and selenium powder, the germanite layer being used for removing chlorine and coarse heavy metals in the water as well as reducing bacteria in the water; a pearl layer located directly downstream from the germanite layer and comprising a plurality of grains each including a granulated third mixture and the ceramic soil surrounding the third mixture, the third mixture including pearl powder, the pearl layer being used for removing small particles and small floating solids in the water; an ore layer located directly downstream from the pearl layer and comprising a plurality of grains each including a granulated fourth mixture and the ceramic soil surrounding the fourth mixture, the fourth mixture including ore powder capable of emitting far-infrared radiation, the ore layer being used for removing odor, color, and organic contaminants in the water; a mineral layer located directly downstream from the ore layer and comprising a plurality of grains each including a granulated fifth mixture and the ceramic soil surrounding the fifth mixture, the fifth mixture including mineral powder and calcite, the mineral layer being used for removing fine heavy metals, chlorine, fine sediment, and fine particles in the water as well as increasing the water's pH; and a gold layer located directly downstream from the mineral layer and comprising a plurality of grains each including a granulated sixth mixture and the ceramic soil surrounding the sixth mixture, the sixth mixture including gold powder, the gold layer being used for removing lead in the water.

The above and other objects, features and advantages of the invention will become apparent from the following detailed description taken with the accompanying drawings.

DETAILED DESCRIPTION OF THE INVENTION

Referring to FIGS. 1 to 6, a drinking water filter 1 in accordance with a preferred embodiment of the invention is shown. The drinking water filter 1 is substantially shaped as a cylinder having tapered top and bottom end portions. The drinking water filter 1 comprises the following components as discussed in detail below.

Figure 1:
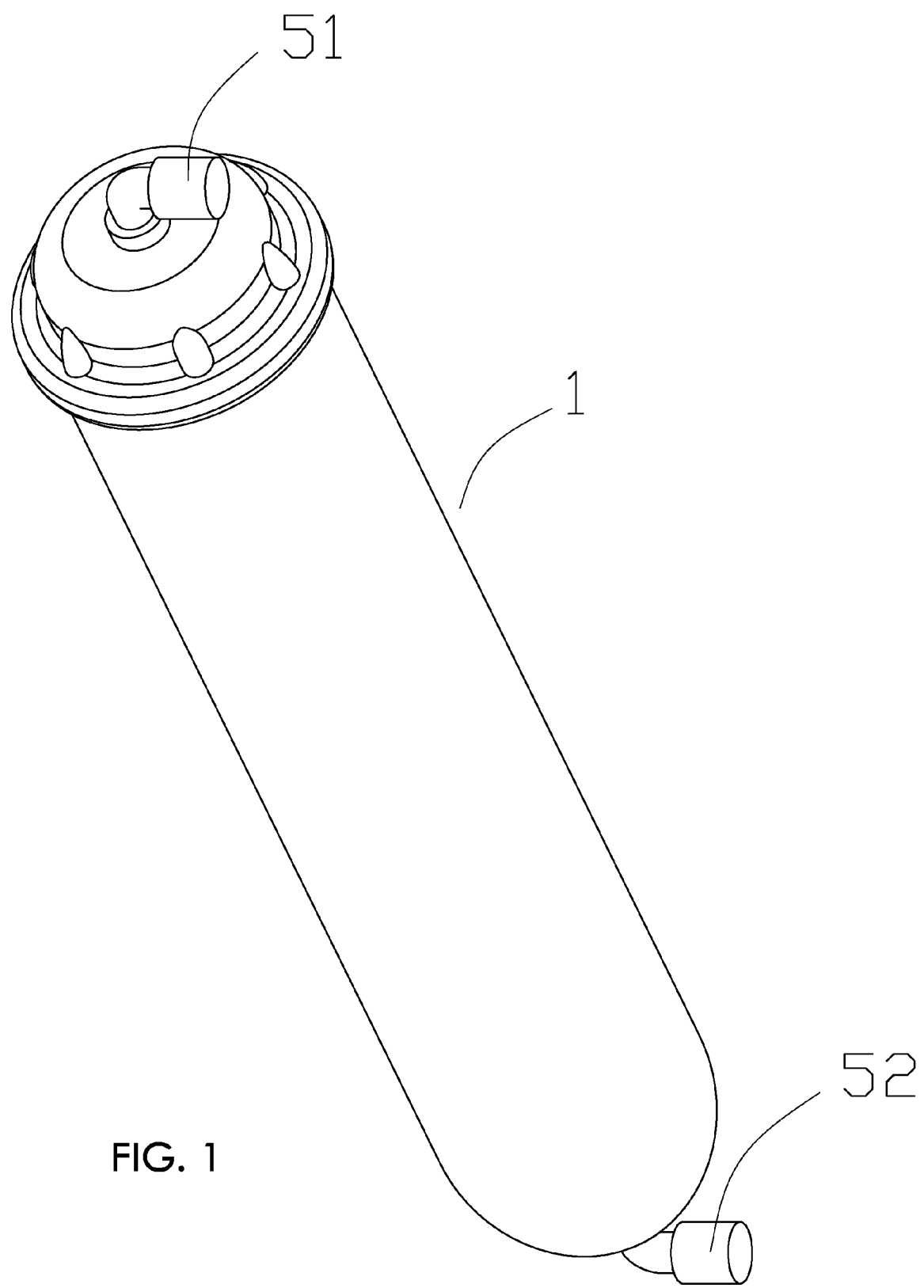
FIG. 1 is a perspective view of a water filter according to a preferred embodiment of the invention.
Figure 2:
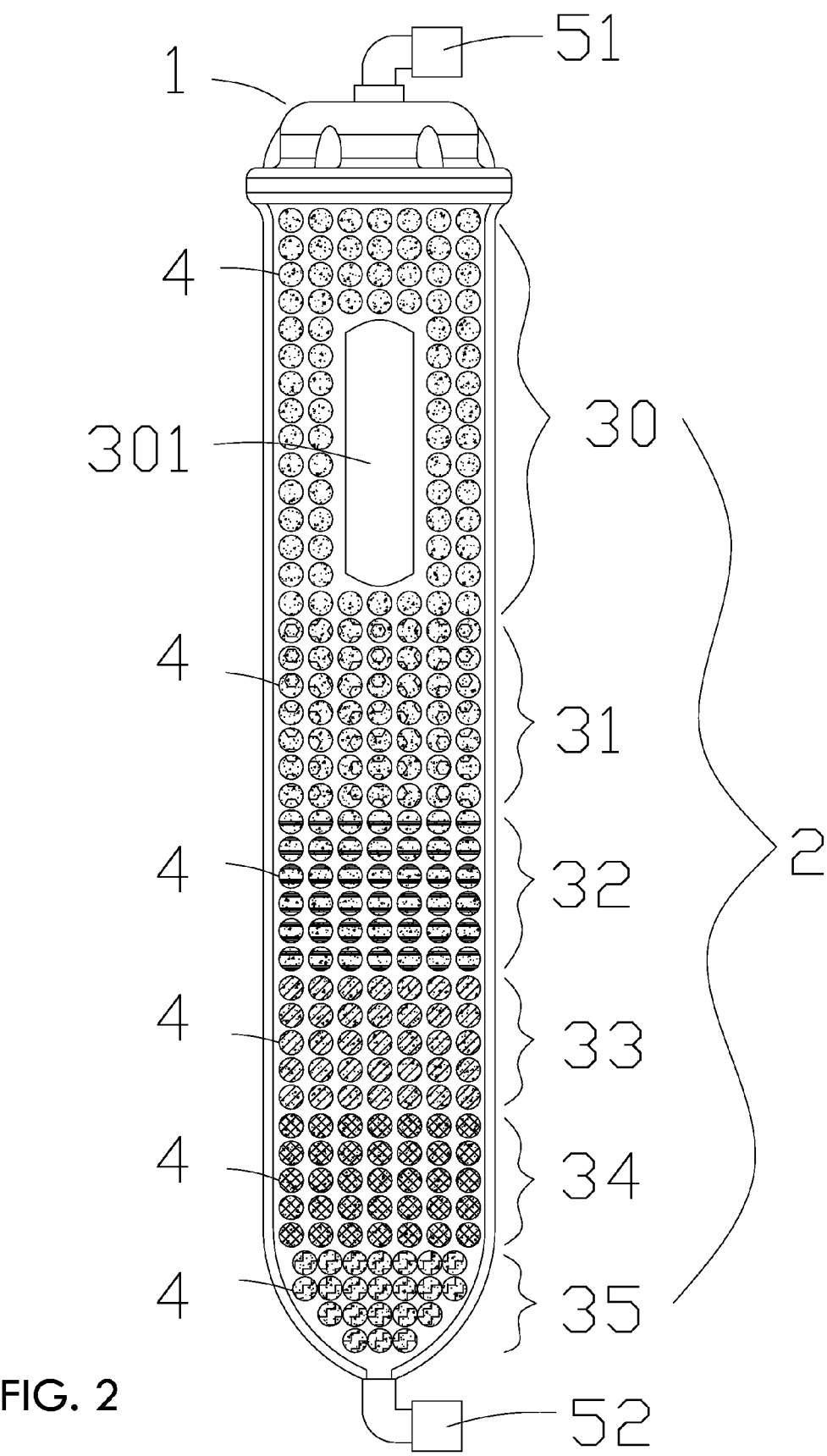
FIG. 2 is a longitudinal sectional view of the filter cartridge of the water filter.
Figure 3:
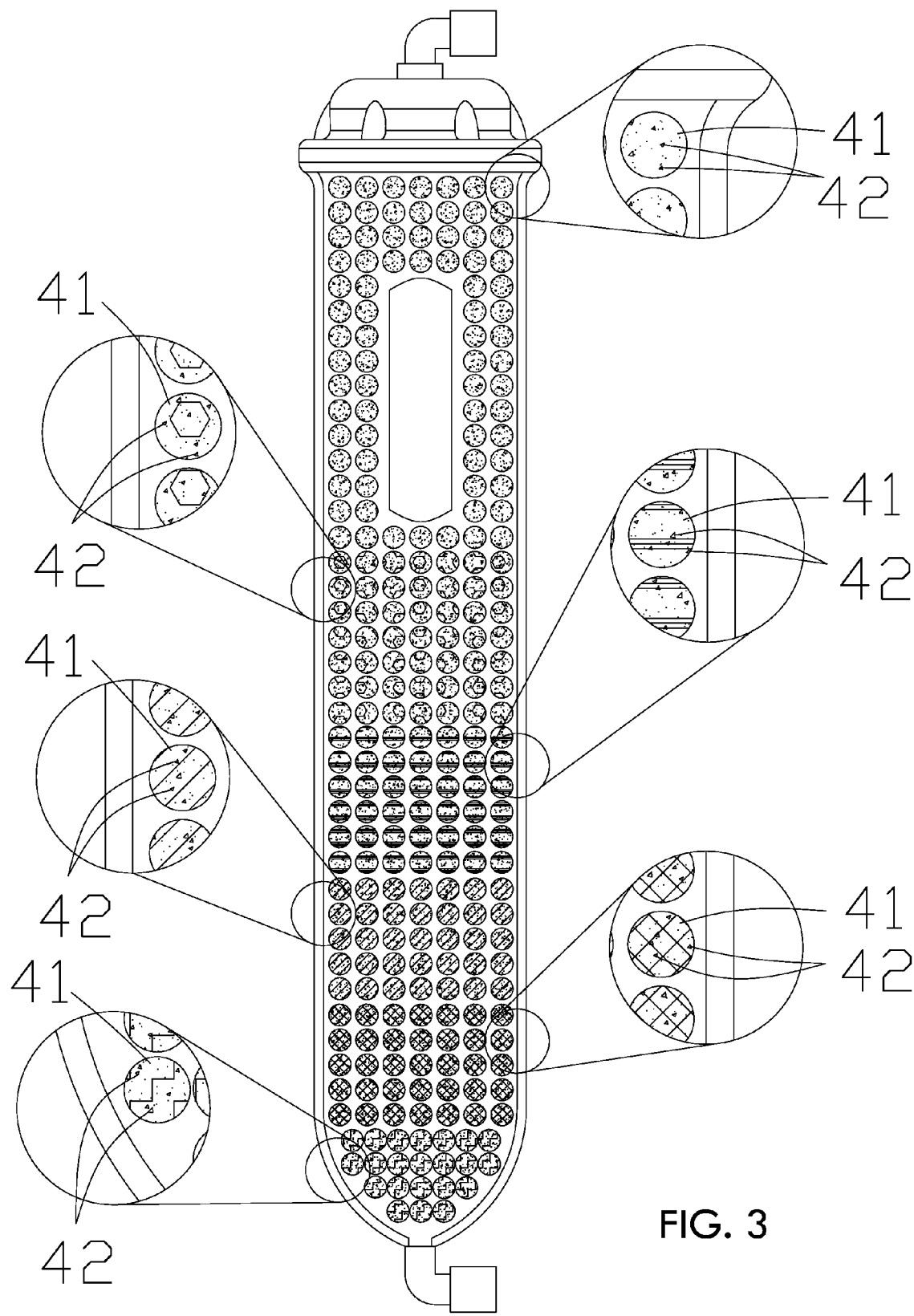
FIG. 3 is a view similar to FIG. 2 showing details of some portions.
Figure 4:
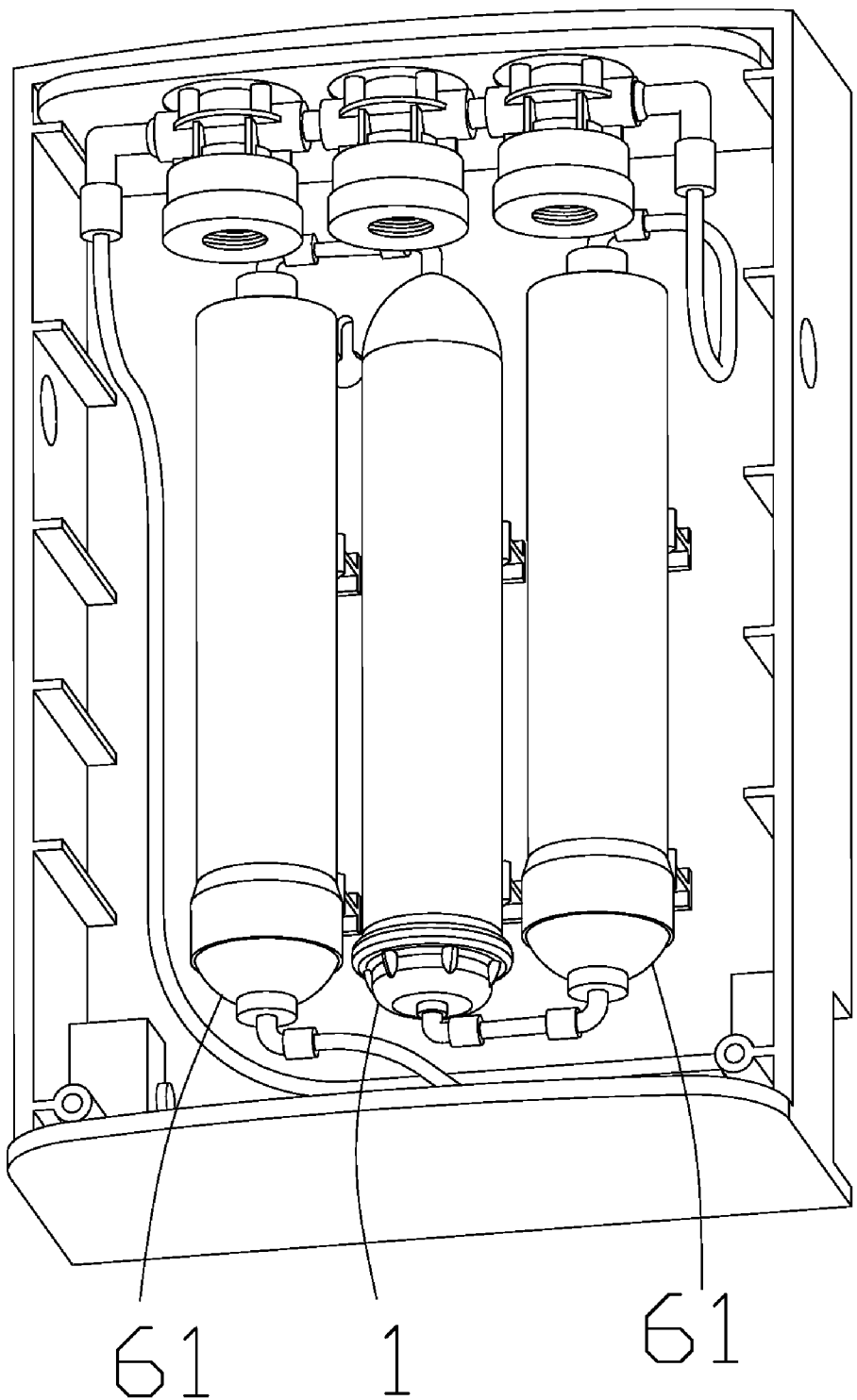
FIG. 4 is a perspective views showing the water filter of the invention and two other typical water filters to be mounted in an enclosure.

A top water inlet 51 in fluid communication with a tap water supply line (not shown) and a bottom water outlet 52 for supplying filtered water are provided. As shown in FIGS. 3 and 4, a filter cartridge 2 comprises, from top to bottom, a main filter 30 having a magnet 301 in a center for attracting metal particles, a germanite layer 31, a pearl layer 32, an ore layer 33, a mineral layer 34, and a gold layer 35. Each of the filter 30 and the layers 31 to 35 comprises a plurality of nanometer sized grains 4.

For the main filter 30, the grain 4 comprises a granulated mixture 42 and a ceramic material 41 surrounding the mixture 42. The mixture 42 comprises tourmaline powder, mica powder, mineral powder, germanite powder, calcite powder, amber powder, agate powder, actinolite powder, crystal powder, and jade powder. The main filter 30 can remove large particles and floating solids in the unfiltered water.

For the germanite layer 31, the grain 4 comprises a granulated mixture 42 and a ceramic material 41 surrounding the mixture 42. The mixture 42 comprises germanite powder and selenium powder. The germanite layer 31 can remove chlorine and coarse heavy metals in the water. Moreover, the germanite layer 31 can keep bacteria from growing inside the filter cartridge 2.

For the pearl layer 32, the grain 4 comprises a granulated mixture 42 and a ceramic material 41 surrounding the mixture 42. The mixture 42 comprises pearl powder. The pearl layer 32 can remove small particles and small floating solids in the water.

For the ore layer 33, the grain 4 comprises a granulated mixture 42 and a ceramic material 41 surrounding the mixture 42. The mixture 42 comprises ore powder capable of emitting far-infrared radiation about 3 THz for cutting long-chained water molecules into shorter ones. The ore layer 33 can remove odor and color from the water being filtered. Moreover, the ore layer 33 can remove organic contaminants including pesticides, herbicides, and mercury in the water.

For the mineral layer 34, the grain 4 comprises a granulated mixture 42 and a ceramic material 41 surrounding the mixture 42. The mixture 42 comprises mineral powder and calcite. The mineral layer 34 can remove fine heavy metals, chlorine, fine sediment, and fine particles in the water. Moreover, the calcite of the mineral layer 34 can increase the water's pH.

For the gold layer 35, the grain 4 comprises a granulated mixture 42 and a ceramic material 41 surrounding the mixture 42. The mixture 42 comprises gold powder. The gold layer 35 can remove lead in the water.

Moreover, the filter cartridge 2 including the filter 30 and the layers 31 to 35 can release appropriate amounts of mineral and chemical elements such as germanium, selenium, zinc, copper, iron, chrome, cobalt, calcium, magnesium, manganese, and potassium to the water being filtered. Thus, the filtered water has an appropriate hardness with lower acidity and increased alkalinity.

Figure 5:
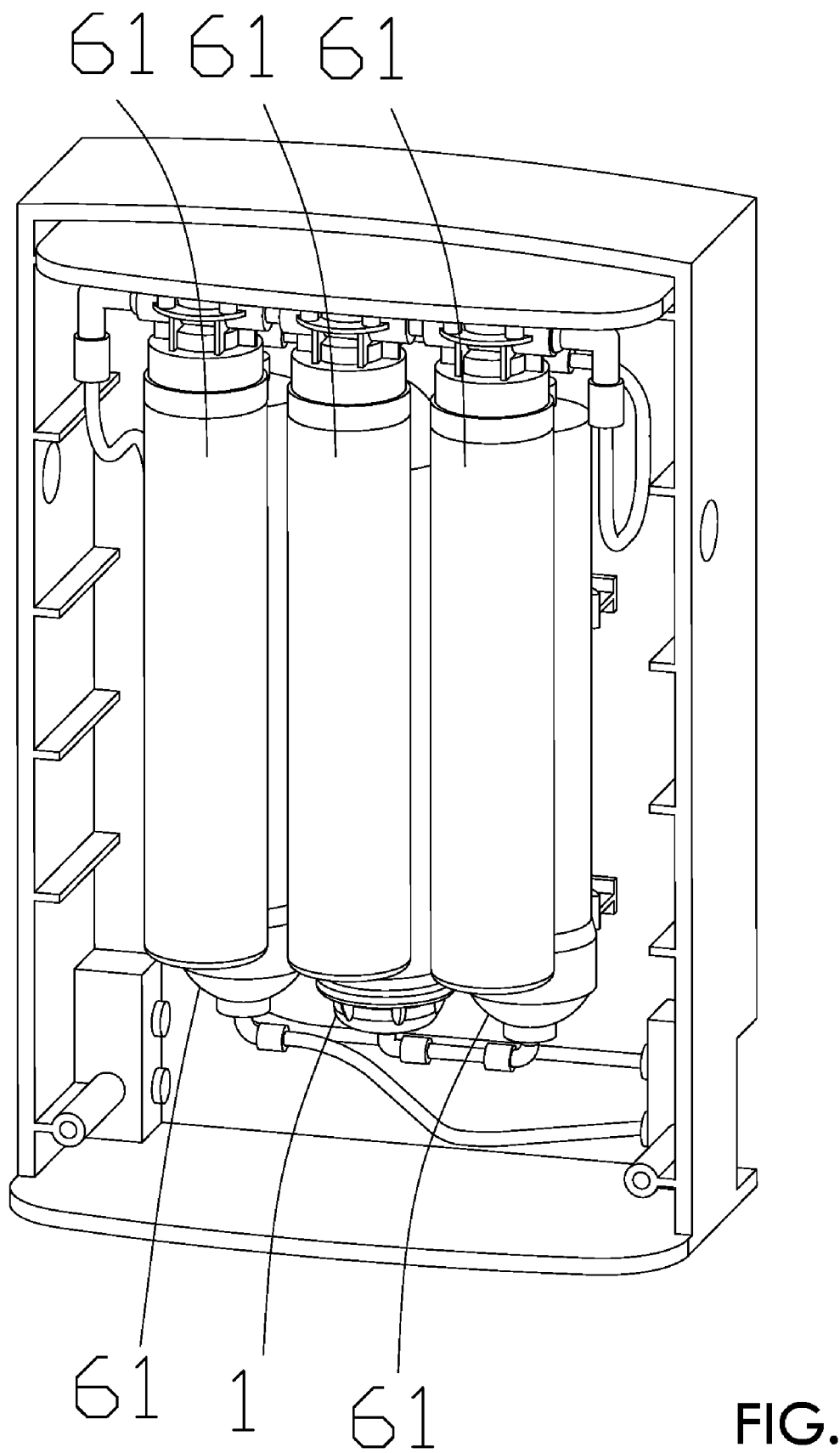
FIG. 5 is a view similar to FIG. 4 showing another three typical water filters, the two typical water filters o FIG. 4, and the water filter of the invention mounted in the enclosure.
Figure 6:
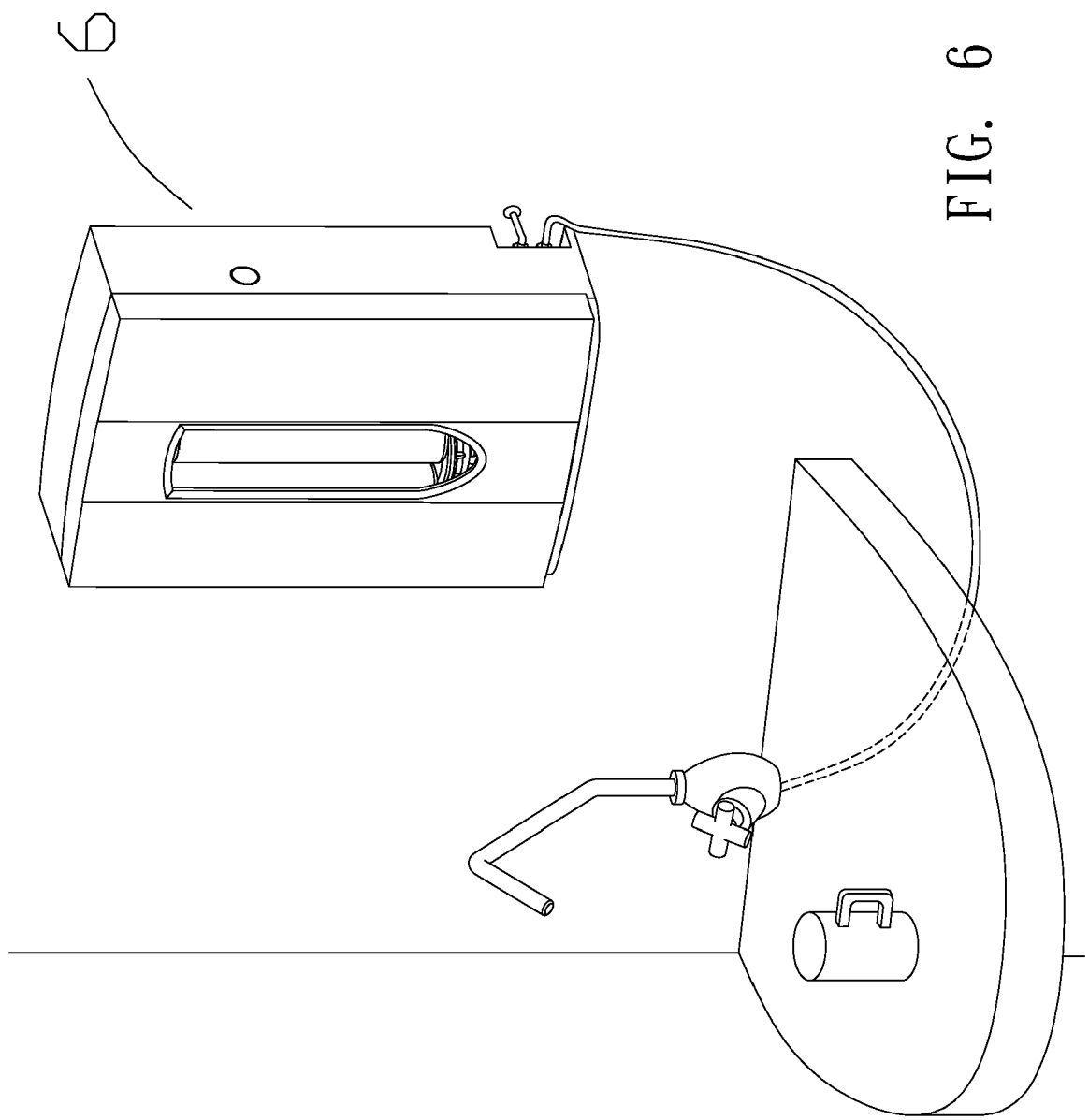
FIG. 6 is a perspective view showing the enclosure mounted on a wall.

As shown in FIGS. 4 to 6, the drinking water filter 1 and five typical water filters 61 are installed in an enclosure 6 as a unit which is in turn mounted on a wall to be used as a portable water source.

While the invention has been described in terms of preferred embodiments, those skilled in the art will recognize that the invention can be practiced with modifications within the spirit and scope of the appended claims.

What is claimed is:

1. A water filter for treating tap water from a water supply, comprising:
   a water inlet;
   a water outlet; and
   a filter cartridge disposed between the water inlet and the water outlet, the filter cartridge comprising:
   a main filter located directly downstream from the water inlet and comprising a plurality of first grains each including a granulated first mixture and a ceramic material surrounding the first mixture, the first mixture including tourmaline powder, mica powder, mineral powder, germanite powder, calcite powder, amber powder, agate powder, actinolite powder, crystal powder, and jade powder, the main filter being used for removing large particles and floating solids in the water;
   a germanite layer located directly downstream from the main filter and comprising a plurality of second grains each including a granulated second mixture and a ceramic material surrounding the second mixture, the second mixture including germanite powder and selenium powder, the germanite layer being used for removing chlorine and coarse heavy metals in the water as well as reducing bacteria in the water;
   a pearl layer located directly downstream from the germanite layer and comprising a plurality of third grains each including a granulated third mixture and a ceramic material surrounding the third mixture, the third mixture including pearl powder, the pearl layer being used for removing small particles and small floating solids in the water;
   an ore layer located directly downstream from the pearl layer and comprising a plurality of fourth grains each including a granulated fourth mixture and a ceramic material surrounding the fourth mixture, the fourth mixture including ore powder capable of emitting far-infrared radiation, the ore layer being used for removing odor, color, and organic contaminants in the water;
   a mineral layer located directly downstream from the ore layer and comprising a plurality of fifth grains each including a granulated fifth mixture and a ceramic material surrounding the fifth mixture, the fifth mixture including mineral powder and calcite, the mineral layer being used for removing fine heavy metals, chlorine, fine sediment, and fine particles in the water as well as increasing the water's pH; and
   a gold layer located directly downstream from the mineral layer and comprising a plurality of sixth grains each including a granulated sixth mixture and a ceramic material surrounding the sixth mixture, the sixth mixture including gold powder, the gold layer being used for removing lead in the water.

2. The water filter of claim 1, wherein the main filter further comprises a central magnet for attracting metal particles.

3. The water filter of claim 1, wherein each of the first, second, third, fourth, fifth, and sixth grains is of nanometer sized.

* * * * *